US010836097B2

(12) United States Patent
Kaltchev et al.

(10) Patent No.: US 10,836,097 B2
(45) Date of Patent: Nov. 17, 2020

(54) APPARATUS, WORK STATION AND METHOD FOR APPLYING PROTECTIVE SHEETING OF POLYMER MATERIAL TO A PIPELINE, AND COMPUTER PROGRAM FOR IMPLEMENTING THE METHOD

(71) Applicant: SAIPEM S.p.A., San Donato Milanese (IT)

(72) Inventors: Momtchil Kaltchev, Carpiano (IT); Walter Marinozzi, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 441 days.

(21) Appl. No.: 15/039,787

(22) PCT Filed: Nov. 28, 2014

(86) PCT No.: PCT/IB2014/066430
§ 371 (c)(1),
(2) Date: May 26, 2016

(87) PCT Pub. No.: WO2015/079423
PCT Pub. Date: Jun. 4, 2015

(65) Prior Publication Data
US 2017/0001365 A1    Jan. 5, 2017

(30) Foreign Application Priority Data

Nov. 29, 2013    (IT) .......................... MI2013A002004

(51) Int. Cl.
*B29C 63/02*    (2006.01)
*B29C 48/151*    (2019.01)
(Continued)

(52) U.S. Cl.
CPC .......... *B29C 63/024* (2013.01); *B29C 48/151* (2019.02); *B29C 48/266* (2019.02);
(Continued)

(58) Field of Classification Search
CPC ....... B29C 63/04; B29C 63/14; B29C 63/145; B29C 63/024; B29C 63/06; B29C 63/12; B29C 47/0047; B29C 47/0059
See application file for complete search history.

(56) References Cited

U.S. PATENT DOCUMENTS 1,969,947 A * 8/1934 Rosener .................. F16L 58/16
156/392
3,259,533 A * 7/1966 Goran .................. B28B 21/925
156/201
(Continued)

FOREIGN PATENT DOCUMENTS

EP    1 985 909    10/2008
EP    1 998 903    12/2008
(Continued)

OTHER PUBLICATIONS

Notification Concerning Submission, Obtention or Transmittal of Priority Document for International Application No. PCT/IB2014/066430 dated Mar. 4, 2015.
(Continued)

*Primary Examiner* — Matthew J Daniels
*Assistant Examiner* — Andrew D Graham
(74) *Attorney, Agent, or Firm* — Neal, Gerber & Eisenberg LLP

(57) ABSTRACT

An apparatus configured to apply protective sheeting of polymer material around a cutback on a pipeline has a frame located close to a pipeline extending along a longitudinal axis; a manipulator fitted to the frame and having a guide system movable between a rest position at a distance from
(Continued)

the pipeline, and a work position in which the guide system is fitted around the pipeline; and an extrusion die movable selectively along the guide system and around the pipeline to supply and apply protective sheeting around the cutback on the pipeline.

16 Claims, 8 Drawing Sheets

(51) Int. Cl.
| | |
|---|---|
| B29C 48/25 | (2019.01) |
| B29C 63/06 | (2006.01) |
| F16L 58/18 | (2006.01) |
| F16L 1/20 | (2006.01) |
| F16L 13/02 | (2006.01) |
| B29C 65/00 | (2006.01) |
| B29C 65/02 | (2006.01) |
| B29C 48/09 | (2019.01) |
| B29K 23/00 | (2006.01) |
| B29K 705/00 | (2006.01) |
| B29L 23/00 | (2006.01) |

(52) U.S. Cl.
CPC ............ *B29C 63/06* (2013.01); *B29C 65/028* (2013.01); *B29C 66/0242* (2013.01); *B29C 66/112* (2013.01); *B29C 66/1122* (2013.01); *B29C 66/1286* (2013.01); *B29C 66/12821* (2013.01); *B29C 66/5326* (2013.01); *B29C 66/652* (2013.01); *B29C 66/72321* (2013.01); *B29C 66/742* (2013.01); *B29C 66/8362* (2013.01); *F16L 1/207* (2013.01); *F16L 13/0272* (2013.01); *F16L 58/181* (2013.01); B29C 48/09 (2019.02); B29C 66/71 (2013.01); B29C 66/7392 (2013.01); B29K 2023/06 (2013.01); B29K 2023/12 (2013.01); B29K 2705/00 (2013.01); B29L 2023/22 (2013.01)

(56) References Cited

U.S. PATENT DOCUMENTS

| | | | | |
|---|---|---|---|---|
| 3,368,007 | A * | 2/1968 | Palmer | B29C 47/0026 264/40.1 |
| 3,547,731 | A * | 12/1970 | Curtis | F16L 58/16 156/392 |
| 3,586,582 | A * | 6/1971 | Inka | B29C 63/12 156/457 |
| 3,660,890 | A * | 5/1972 | Terry | B29C 63/06 228/150 |
| 3,671,362 | A * | 6/1972 | Pierce et al. | B29C 63/024 156/494 |
| 3,755,039 | A * | 8/1973 | Terry | B26D 3/001 138/149 |
| 3,984,906 | A * | 10/1976 | Schlosser | B29C 63/06 29/890.14 |
| 4,007,705 | A * | 2/1977 | Sherer | B05B 13/0436 118/307 |
| 4,061,513 | A * | 12/1977 | Danielson | B29C 63/14 156/392 |
| 4,096,017 | A * | 6/1978 | Wyke | B29C 63/06 156/274.2 |
| 4,113,545 | A * | 9/1978 | Stuart, Jr. | B29C 63/14 156/392 |
| 4,568,407 | A * | 2/1986 | Barbieri | B26F 1/3846 156/510 |
| 4,574,023 | A * | 3/1986 | Edwards | B65H 81/06 156/187 |
| 5,118,374 | A * | 6/1992 | Suwitoadji | B29C 53/04 156/212 |
| 5,273,611 | A * | 12/1993 | Webb | F16L 58/1063 156/392 |
| 5,589,019 | A * | 12/1996 | Van Beersel | B29C 63/14 156/184 |
| 5,792,308 | A * | 8/1998 | Ryan | B26D 5/16 156/446 |
| 6,059,319 | A * | 5/2000 | Wyke | B29C 65/344 219/535 |
| 6,440,245 | B1 * | 8/2002 | Culzoni | B29C 63/06 156/187 |
| 6,626,376 | B1 * | 9/2003 | Rose | B05B 13/0436 118/316 |
| 7,686,910 | B2 * | 3/2010 | Habisreitinger | B29C 63/02 156/229 |
| 2005/0286994 | A1 * | 12/2005 | Meyer | B29C 47/34 414/784 |
| 2007/0277923 | A1 * | 12/2007 | Wood | B29C 63/06 156/187 |
| 2007/0277932 | A1 * | 12/2007 | Aveldson | B29C 63/024 156/358 |
| 2010/0065614 | A1 * | 3/2010 | Cittadini Bellini | B23K 37/0533 228/176 |
| 2010/0133324 | A1 * | 6/2010 | Leiden | B29C 48/30 228/176 |
| 2010/0186881 | A1 * | 7/2010 | Bergonzio | B29C 63/06 156/187 |
| 2011/0248072 | A1 * | 10/2011 | Leiden | B23K 9/0282 228/199 |
| 2011/0259509 | A1 * | 10/2011 | Pine | B29C 63/14 156/187 |
| 2013/0042967 | A1 * | 2/2013 | Jostler | B29C 47/0021 156/227 |
| 2014/0154409 | A1 * | 6/2014 | Bregonzio | B29C 63/06 427/178 |
| 2014/0290822 | A1 * | 10/2014 | Schaaf | B29C 63/024 156/60 |
| 2014/0370200 | A1 * | 12/2014 | Krutzen | B05B 13/0436 427/427.1 |
| 2016/0023398 | A1 * | 1/2016 | Drinic | B29C 63/0095 425/145 |
| 2016/0257064 | A1 * | 9/2016 | Scaini | B29C 63/06 |

FOREIGN PATENT DOCUMENTS

| | | |
|---|---|---|
| EP | 2 100 068 | 9/2009 |
| EP | 2 181 832 | 5/2010 |
| EP | 2 477 758 | 7/2012 |
| EP | 2 477 796 | 7/2012 |
| EP | 2 535 168 | 12/2012 |
| EP | 2 535 639 | 12/2012 |
| WO | WO 2013/115646 | * 8/2013 |

OTHER PUBLICATIONS

International Search Report and Written Opinion for International Application No. PCT/IB2014/066430 dated Mar. 16, 2015.
PCT Demand for International Preliminary Examination and Reply to International Search Report and the associated Written Opinion for International Application No. PCT/IB2014/066430 dated Sep. 29, 2015.
Notification of Receipt of Demand by Competent international Preliminary Examining Authority (Form PCT/IPEA/402) for International Application No. PCT/IB2014/066430 dated Oct. 5, 2015.
Second Written Opinion of the International Preliminary Examining Authority for International Application No. PCT/IB2014/066430 dated Nov. 13, 2015.
Reply to the Second Written Opinion of the International Searching Authority for International Application No. PCT/IB2014/066430 dated Dec. 22, 2015.
Notification Concerning Informal Communications with the Applicant for International Application No. PCT/IB2014/066430 dated Feb. 8, 2016.
Reply to the Notification for International Application No. PCT/IB2014/066430 dated Feb. 15, 2016.

(56) References Cited

OTHER PUBLICATIONS

Notification of Transmittal of the International Preliminary Report on Patentability (Form PCT/IPEA/416) for International Application No. International Application No. PCT/IB2014/066430 dated Mar. 11, 2016.
"Nozzle—Wikipedia, the free encyclopedia", Oct. 18, 2007, XP055106163, Retrieved the Internet: URL: http://web.archive.org/web/20071018091534/http://en.wikipedia.org/wiki/Nozzle [retrieved on Mar. 7, 2014].

* cited by examiner

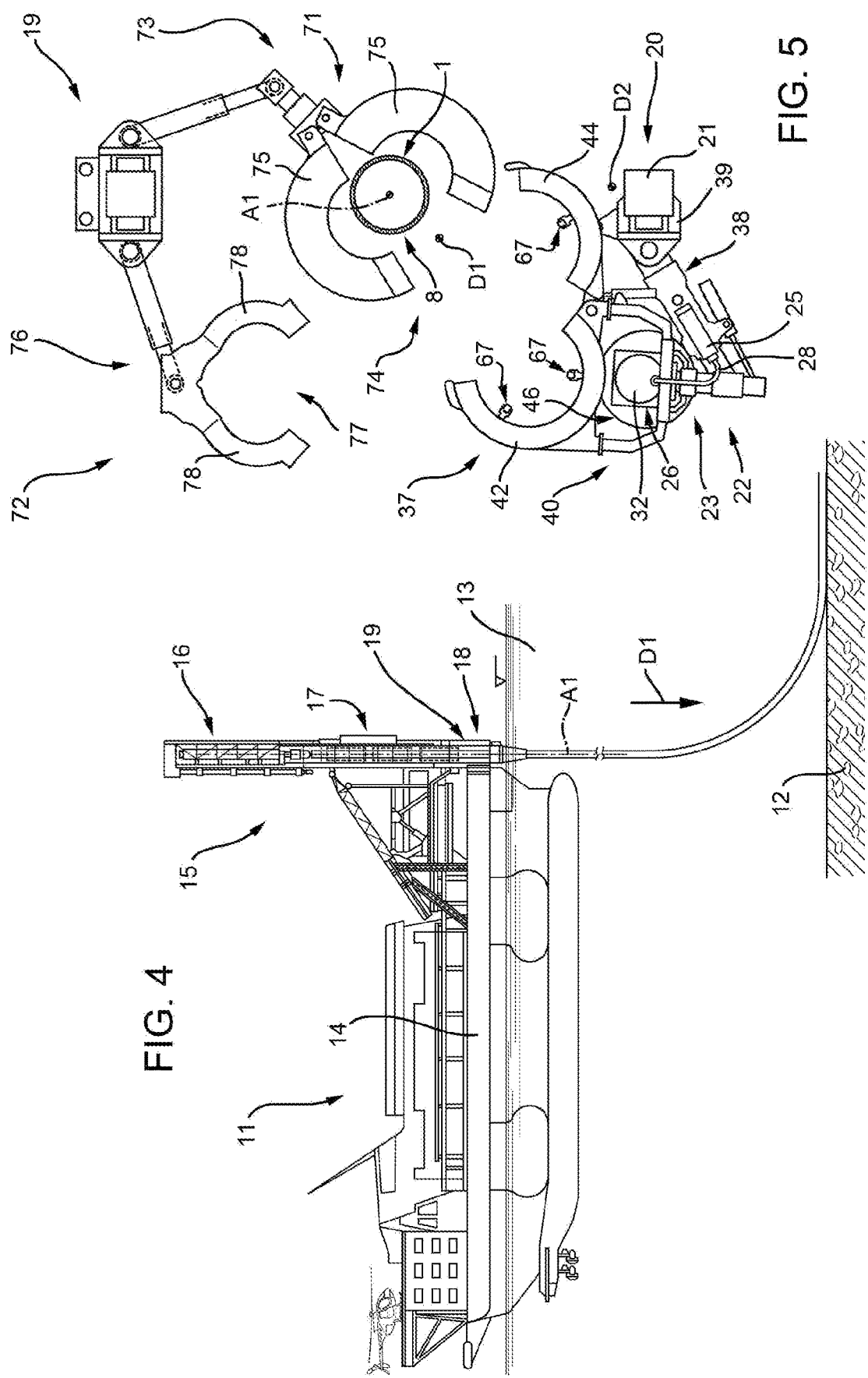

APPARATUS, WORK STATION AND METHOD FOR APPLYING PROTECTIVE SHEETING OF POLYMER MATERIAL TO A PIPELINE, AND COMPUTER PROGRAM FOR IMPLEMENTING THE METHOD

PRIORITY CLAIM

This application is a national stage application of PCT/IB2014/066430, filed on Nov. 28, 2014, which claims the benefit of and priority to Italian Patent Application No. MI2013A002004, filed on Nov. 29, 2013, the entire contents of which are each incorporated by reference herein.

BACKGROUND

One known method of applying protective sheeting to connect the existing coating along the cutback of joined pipes is to apply protective sheeting to the cutback as protective sheeting is extruded. In recent times, various apparatuses have been made known in this particular field of technology. The Applicant, in particular, has developed a number of techniques based on the principles expounded in EP Patent No. 2,100,068 and EP Patent No. 2,535,168 and EP Patent Application No. 2,535,639. Other significant documentation includes EP Patent No. 1,985,909, EP Patent No. 1,998,903, EP Patent No. 2,181,832, EP Patent No. 2,477,796 and EP Patent No. 2,477,758. More specifically, the above documents relate to apparatuses configured to apply protecting sheeting to a cutback using an extruder die mounted on a guide and movable along an annular path around the longitudinal axis of the pipeline to extrude and simultaneously apply the protective sheeting to the pipeline.

Though the Applicant's experimental apparatuses have proved relatively highly successful, certain of the apparatuses devised so far are still not altogether satisfactory for mass production use on pipeline construction lines.

SUMMARY

The present disclosure relates to an apparatus configured to apply protective sheeting of polymer material to a pipeline, in particular around a cutback on a substantially vertical pipeline.

The apparatus according to the present disclosure is used on a pipeline construction line, in particular configured to construct underwater pipelines configured to lay on the bed of a body of water, and to which the following description refers purely by way of example. Underwater pipelines are normally constructed by joining the facing free ends of adjacent pipes aligned along a longitudinal axis to define a cutback; and winding protective sheeting about the cutback. Pipelines are composed of pipes joined to one another to cover distances of hundreds of kilometers. The pipes are of normally 12-metre standard length and of relatively large diameter ranging from 0.2 to 1.5 metres. Each pipe comprises a metal cylinder; and a polymer coating configured to protect the metal cylinder. The opposite ends of each pipe have no coating, so the metal cylinders can be welded to one another. The pipes may be joined at land-based installations, or on laying vessels which normally also provide for laying the pipeline as the pipeline is constructed.

The joining operation comprises welding the metal cylinders together, normally with a number or quantity of weld passes; and coating the cutback. Welding forms an annular weld bead projecting between the adjacent metal cylinders. And the cutback extends astride the annular weld bead, along an uncoated portion. In other words, the cutback is substantially defined by the free ends of the pipes, extends axially between two end portions of the coating, and must be covered with protective sheeting to prevent corrosion.

Applying protective sheeting to connect the existing coatings along the cutback is known as 'Field Joint Coating'.

It is an advantage of the present disclosure to provide an apparatus of the type described above, which provides for relatively high-output performance on pipeline construction lines.

According to the present disclosure, there is provided an apparatus configured to apply protective sheeting of polymer material around a cutback on a pipeline, the apparatus comprising a frame located close to a pipeline extending along a longitudinal axis; a manipulator fitted to the frame and comprising a guide system movable between a rest position at a distance from the pipeline, and a work position in which the guide system is fitted around the pipeline; and an extrusion die movable selectively along the guide system and around the pipeline to supply and apply protective sheeting around the cutback on the pipeline.

The protective sheeting can thus be applied using an extrusion die which rotates about the pipeline on a guide system fitted around the pipeline. Once the protective sheeting is applied, the guide system is withdrawn a designated distance from the pipeline into a relatively safe position, as the pipeline is moved forward to feed the next cutback to the apparatus, and/or to prevent interfering with any preliminary work carried out on the cutback by other apparatuses prior to applying the protective sheeting.

In certain embodiments of the present disclosure, the guide system comprises a number or quantity of spacers which, in the work position, are positioned contacting the pipeline to center the guide system around the pipeline, and are configured to permit axial movement of the guide system with respect to the pipeline.

The pipeline is fed forward in steps and, because of its size and mass, is relatively difficult to stop in a precise position ensuring the cutbacks, at each step, are located in the exact same position with respect to the guide system. By virtue of the present disclosure, the guide system, as opposed to gripping the pipeline, forms a coupling which enables the guide system to move along the pipeline.

In certain embodiments, the spacers are divided into two axially spaced groups, each comprising at least three spacers arranged around the longitudinal axis.

More specifically, the groups of spacers are spaced apart by a distance greater than the width of the cutback.

In certain embodiments, each spacer comprises a roller configured to contact the pipeline and assist axial movement between the guide system and the pipeline. This way, the guide system can be centered on the pipeline, and the axial position of the guide system adjusted relatively easily.

In certain embodiments, the manipulator is movable selectively with respect to the frame to axially adjust the position of the guide system with respect to the cutback on the pipeline.

In certain embodiment, the entire manipulator is moved axially with respect to the pipeline, as opposed to only adjusting the position of the guide system.

In certain embodiments of the present disclosure, the guide system comprises at least one sensor to determine the axial position of the guide system with respect to the cutback.

The characteristic conformation of the cutback enables the axial position of the guide system with respect to the cutback to be determined using a sensor. The sensor supplies signals comparable with reference values to adjust the axial position of the guide system.

In certain embodiments of the present disclosure, the manipulator comprises an articulated system configured to move the guide system between the work position and the rest position; and a universal joint to connect the articulated system to the guide system and permit angular movement of the guide system with respect to the articulated system when the guide system is positioned contacting the pipeline, in the work position.

The freedom of movement enabled by the universal joint thus enables the guide system to align with the pipeline at the final stage in connection to the pipeline. The manipulator serves to move the system between a work position and a rest position, to determine the axial position of the guide system, and to prevent the guide system, in the work position, from rotating about the pipeline.

In certain embodiments of the present disclosure, the apparatus comprises an extrusion device which is fitted to the guide system, and is connected by a hose to the extrusion die to permit relative movement between the extrusion die and the extrusion device.

The extrusion device and extrusion die are thus relatively close to each other, with no need to move the extrusion device around the pipeline.

In certain embodiments, the apparatus comprises a winder configured to wind and unwind the hose according to the position of the extrusion die with respect to the guide system. That is, the hose is controlled and guided to prevent the hose from forming tight bends and becoming crushed, thus cutting off all or part of the soft material supply to the extrusion die.

In certain embodiments, the winder comprises a reel which rotates about a rotation axis to wind and unwind the hose according to the position of the extrusion die with respect to the guide system.

Controlling the hose comprises seating the hose inside assigned seats, in which the hose does not interfere with other parts of the apparatus.

In certain embodiments, the apparatus comprises a rotary hydraulic joint having a rotating portion that rotates about the rotation axis and is connected to the hose, and a fixed part connected rigidly to the outlet of the extrusion device. This prevents relatively dangerous twisting of the hose.

In certain embodiments, the reel and the rotating portion of the rotary hydraulic joint are powered to rotate both ways around the rotation axis. This provides for synchronizing movement with the movement of the extrusion die around the pipeline.

In certain embodiments of the present disclosure, the apparatus comprises a plastifying device; and a further hose configured to connect the plastifying device to the extrusion device and enabling relative movement between the plastifying device and the extrusion device. This enables preferential positioning of the plastifying device.

In certain embodiments, the plastifying device is mounted on the articulated system.

More specifically, the plastifying device is mounted on the manipulator.

A further advantage of the present disclosure is to provide a relatively highly efficient work station configured to apply protective sheeting to a cutback on a pipeline.

According to the present disclosure, there is provided a work station configured to apply protective sheeting to a cutback on a pipeline, the work station comprising an apparatus configured to apply protective sheeting around a cutback on a pipeline; and at least one further apparatus configured to perform operations preliminary to application of the protective sheeting; the further apparatus and the apparatus being fitted successively about the pipeline and about the cutback. This enables at least two different operations to be performed in relatively rapid succession at the same work station.

A further advantage of the present disclosure is to provide a method of applying protective sheeting of polymer material about a cutback on a pipeline.

According to the present disclosure, there is provided a method of applying protective sheeting of polymer material around a cutback on a pipeline, the method comprising the steps of selectively setting a guide system by a manipulator fitted to a frame to a work position, in which the guide system is fitted around a pipeline extending along a longitudinal axis, and a rest position, in which the guide system is relatively distant from the pipeline; and moving an extrusion die, guided by the guide system, around the pipeline to supply and apply protective sheeting around a cutback on the pipeline. This way, the guide system does not interfere with the pipeline as the pipeline is moved forward, or with any other work carried out on the cutback.

In certain embodiments, the method comprises centering the guide system around the pipeline by spacers; and axially adjusting the position of the guide system with respect to the cutback.

Centering the guide system around the pipeline is relatively highly precise operation, to ensure constant clearance of the extrusion die as it travels around the pipeline. Moreover, the axial position of the guide system ensures a given or designated position of the protective sheeting with respect to the cutback.

In certain embodiments, the method comprises moving the guide system by an articulated system; and axially adjusting the position of the articulated system to axially adjust the position of the guide system with respect to the cutback on the pipeline. This relatively simplifies connection of the articulated arm to the guide system.

In certain embodiments of the disclosure, the method comprises determining the axial position of the guide system with respect to the cutback.

Given the position of the guide system with respect to the cutback, a closed-loop system can be formed to position the guide system axially.

In certain embodiments, the method comprises the step of supporting the guide system in the work position by an articulated system connected to the guide system by a universal joint, so as to center and align the guide system on and with the pipeline. That is, when being fitted around the pipeline, the guide system must be free to orient itself parallel to the pipeline.

In certain embodiments of the present disclosure, the method comprises transferring the soft polymer material from an extrusion device, mounted on the guide system, to the extrusion die by a hose, so as to enable relative movement between the extrusion die and the extrusion device.

Separating the extrusion die from the extrusion device reduces the size and weight of the movable part that runs around the pipeline.

The hose, on the other hand, enables the extrusion die to move freely with respect to the extrusion device.

In certain embodiments, the method comprises winding and unwinding the hose according to the position of the extrusion die along the guide system.

Though the hose enables freedom of movement, in certain embodiments, the position of hose is controlled to prevent the hose from bending and/or getting into unfavourable or interference positions.

In certain embodiments, the method comprises transferring the soft polymer material from a plastifying device to the extrusion device by a further hose configured to connect the plastifying device to the extrusion device and to enable relative movement between the plastifying device and the extrusion device.

The plastifying process involves feeding the polymer material, in the form of solid granules, to the plastifying device, and this operation is, in certain embodiments, performed relatively far from the pipeline.

Control of the apparatus, step feed of the pipeline, and the other pipeline construction control systems are all synchronized.

Additional features and advantages are described in, and will be apparent from the following Detailed Description and the figures.

BRIEF DESCRIPTION OF THE DRAWINGS

Certain embodiments of the present disclosure will be described with reference to the attached drawings, in which:

FIG. 4 shows a side view, with parts removed for clarity, of a laying vessel for laying the pipeline on the bed of a body of water;

FIG. 5 shows a plan view, with parts removed for clarity, of a work station on a line for constructing the FIG. 1 pipeline;

DETAILED DESCRIPTION

The Pipeline

Figure 1:
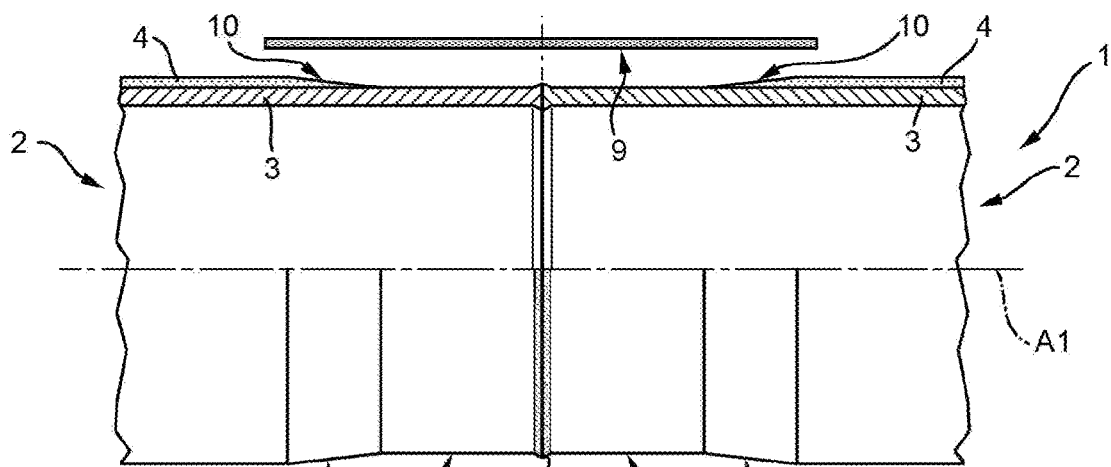
FIG. 1 shows a partly sectioned side view, with parts removed for clarity, of a pipeline and protective sheeting.
Figure 2:
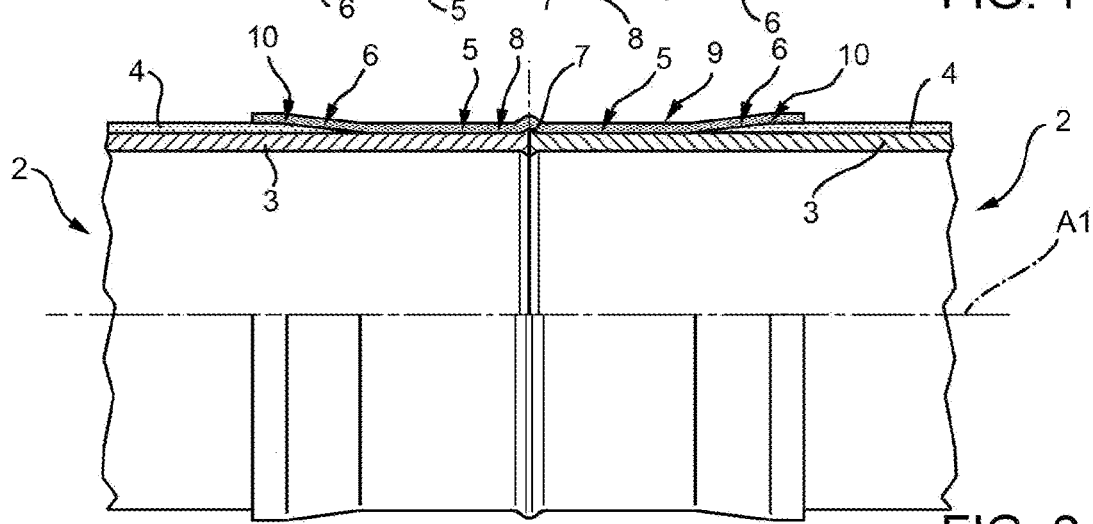
FIG. 2 shows a partly sectioned side view, with parts removed for clarity, of the pipeline with the protective sheeting applied.

Referring now to the example embodiments of the present disclosure illustrated in FIGS. 1 to 13, number 1 in FIGS. 1 and 2 indicates as a whole a pipeline extending along a longitudinal axis A1. In the FIG. 1 example, pipeline 1 comprises two pipes 2 aligned along longitudinal axis A1. Each pipe 2 comprises a metal cylinder 3; and a polymer coating 4, normally of polyethylene or polypropylene, contacting and for corrosion-proofing metal cylinder 3.

Each pipe 2 has two opposite free ends 5 (only one of which is shown in FIG. 1) with no coating 4, which has a bevel 6 at each free end 5. Two consecutive pipes 2 aligned along longitudinal axis A1 are positioned with their free ends 5 contacting, and are welded, possibly with a number or quantity of weld passes, to form an annular weld bead 7 between pipes 2. The two welded pipes 2 define a cutback 8, which extends along longitudinal axis A1, between the two consecutive bevels 6 of coatings 4, and comprises annular weld bead 7.

Joining pipes 2 forms pipeline 1. In this description, 'pipeline 1' is also intended to mean the pipeline as the pipeline is being constructed, and even only comprising, for example, two joined pipes 2.

In addition to welding metal cylinders 3, joining pipes 2 also comprises forming a covering seamlessly connecting existing coatings 4. This comprises applying protective sheeting 9 around cutback 8 and two end portions 10 of coatings 4; and causing the protective sheeting 9 to adhere to cutback 8 and end portions 10 of coatings 4.

Applying protective sheeting 9 normally involves preparing the surfaces of cutback 8 and end portions 10 to improve adhesion of protective sheeting 9. Which surface-preparation work comprises cleaning (e.g., grit-blasting), and heating (e.g., induction heating) cutback 8.

Protective sheeting 9 is 1-7 mm thick and made of a polymer, such as polyolefins, and, in certain embodiments, CMPE or CMPP.

Protective sheeting 9 is wider than cutback 8 (measured along longitudinal axis A1), so as to overlap respective end portions 10 of coatings 4, and is long enough to cover the perimeter of cutback 8 and to overlap the end portions of protective sheeting 9.

Protective sheeting 9 is extruded as protective sheeting is applied around pipeline 1. This technique produces protective sheeting 9 which, at the application stage, is highly flexible, adapts closely to the shape of coatings 4 and cutback 8, and adheres firmly to pipeline 1, as shown in FIG. 2.

Figure 3:
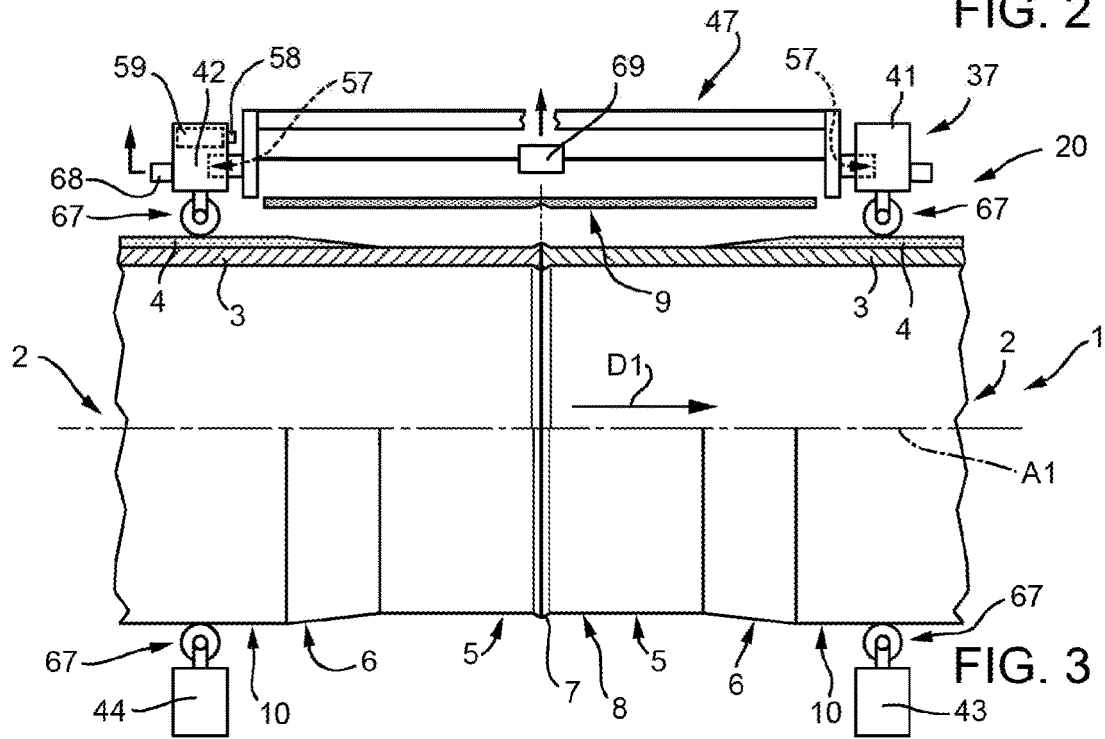
FIG. 3 shows a partly sectioned, schematic side view, with parts removed for clarity, of the pipeline, and a protective sheeting application apparatus fitted around the FIG. 1 pipeline.

Number 20 in FIG. 3 indicates an apparatus configured to apply protective sheeting 9 to pipeline 1.

Pipeline 1 so formed is suitable for various applications, such as, for example, underwater piping hydrocarbons.

The Laying Vessel

The joining process described to construct pipeline 1 may be carried out at land-based installations, or on laying vessels, such as laying vessel 11 in FIG. 4.

Laying vessel 11 is configured to construct and lay pipeline 1 on the bed 12 of a body of water 13.

Vessel 11 comprises a floating structure 14; and a J-laying rig 15 configured to assemble and lay pipeline 1. Though shown upright, J-laying rig 15 may be tilted at an angle of up to 30° to the vertical when laying pipeline 1.

Laying rig 15 comprises a top portion 16 where pipeline 1 is assembled; an intermediate portion 17 where a tensioning device (not shown) is operated; and a bottom portion 18 housing a work station 19 where pipeline 1 is stopped, and protective sheeting 9 is applied by an apparatus 20 (FIG. 3).

Protective Sheeting Application Apparatus

With reference to FIG. 5, apparatus 20 is configured to apply protective sheeting 9 (FIGS. 1, 2 and 3) to cutbacks 8 fed successively into work station 19 as pipeline 1 is fed forward in steps. Apparatus 20 as a whole is configured to perform work cycles, each of which comprises plastifying the polymer material of which protective sheeting 9 (FIGS.

1, 2 and 3) is made; engaging pipeline 1, around cutback 8 (FIG. 3); and extruding and simultaneously applying protective sheeting 9 (FIGS. 1, 2 and 3) around cutback 8 on pipeline 1. For this reason, apparatus 20 is configured to move into a work position, in which apparatus is fitted around pipeline 1 (FIG. 7), and a rest position (FIG. 5), in which the whole of apparatus 20 is positioned at a distance from pipeline 1.

Constructing pipeline 1 comprises feeding pipeline 1 in steps in a direction D1 parallel to longitudinal axis A1, which is substantially vertical or at any rate tilted sharply to the horizontal; and fitting apparatus 20 (FIG. 7) around pipeline 1, at cutback 8. In this description, the term 'axial' refers to longitudinal axis A1.

Figure 6:
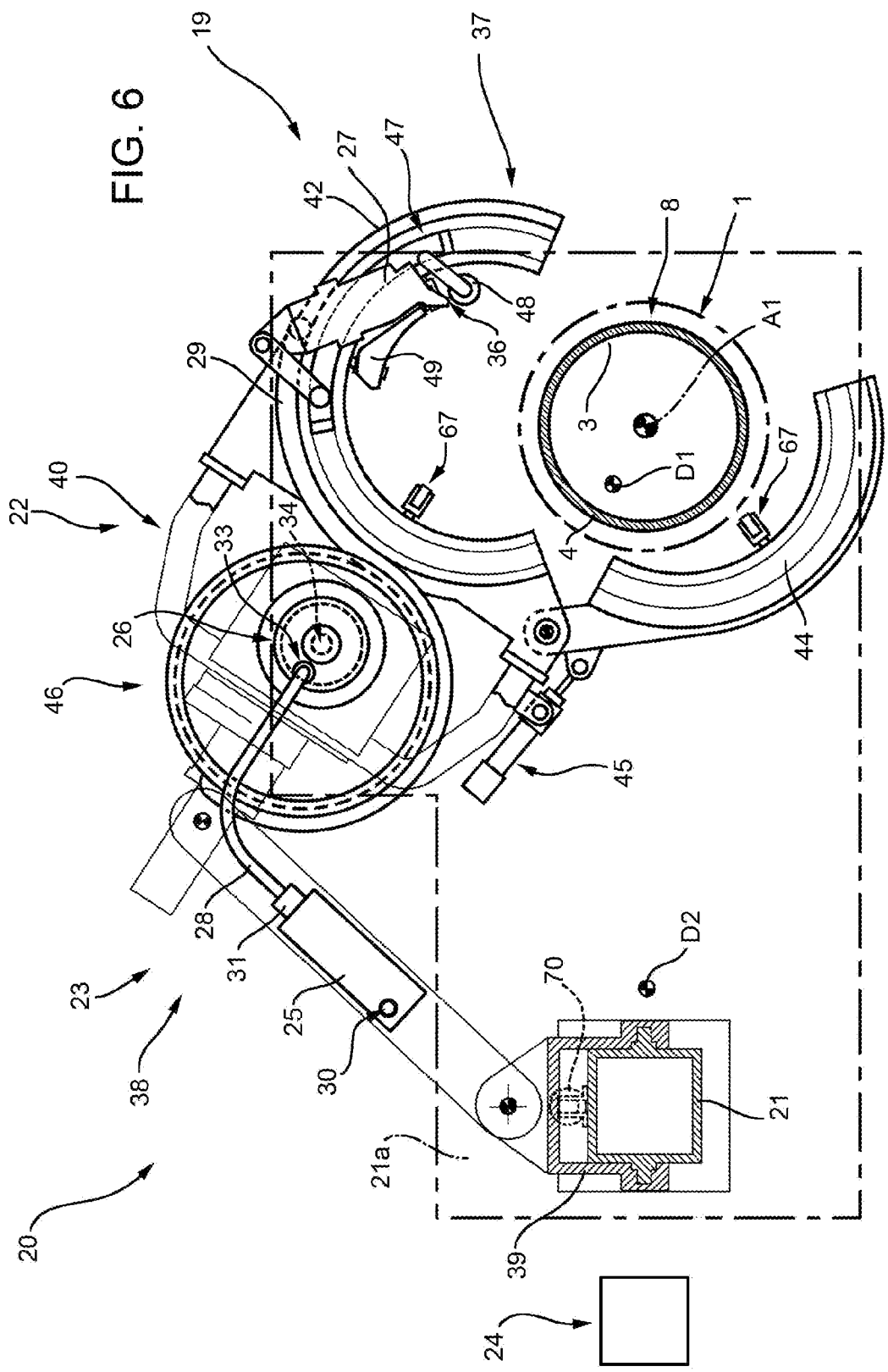
FIG. 6 shows a larger-scale, partly sectioned plan view, with parts removed for clarity, of an apparatus for applying protective sheeting to the pipeline.
Figure 7:
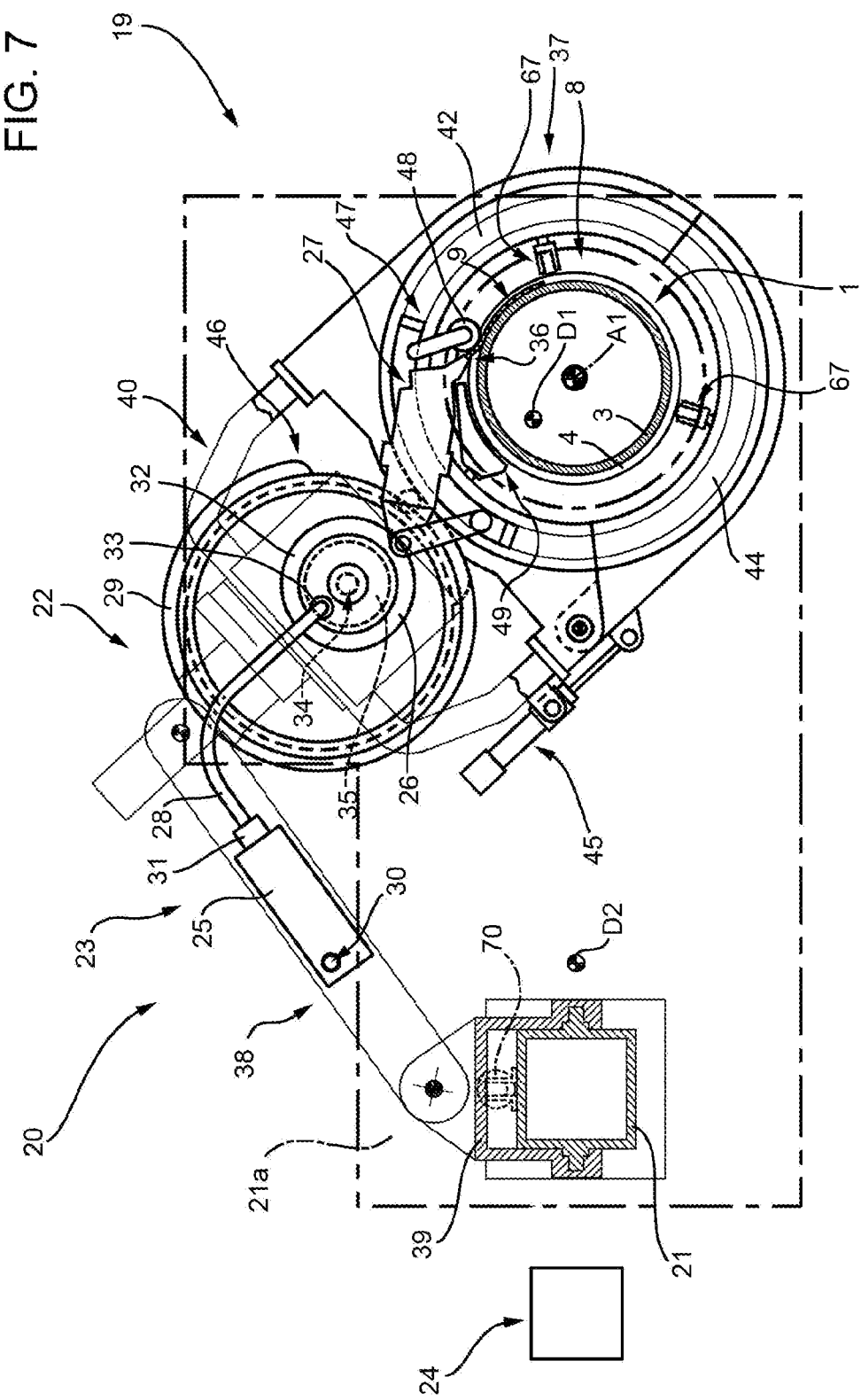
FIG. 7 shows a partly sectioned plan view, with parts removed for clarity, of the FIG. 6 apparatus in a work position, fitted around the pipeline.

With reference to FIGS. 6 and 7, apparatus 20 comprises:
a frame 21;
an extrusion line 22 configured to plastify solid polymer material, and configured to extrude and apply soft protective sheeting 9;
a mechanical manipulator 23 mounted on frame 21 to connect extrusion line 22 selectively to pipeline 1;
a control system 24 including a computer and configured to coordinate the movements of manipulator 23 with the movement of pipeline 1, and to control the plastifying and extrusion processes on extrusion line 22.

Frame 21 is straight and serves to support manipulator 23 slidably in a direction D2 which, in the example shown, but not necessarily, is parallel to D1 and to longitudinal axis A1. That is, in certain embodiments, pipeline 1 and frame 21 can practically never be perfectly parallel to each other. In some cases, frame 21 is mounted on a rocking platform 21a, which is movable with respect to J-laying rig 15 (FIG. 4) so as to remain horizontal regardless of the tilt angle of the J-laying rig (FIG. 4).

Extrusion line 22 comprises a plastifying device 25, an extrusion device 26, and an extrusion die 27.

In the embodiment shown in the attached drawings, plastifying device 25 is connected to extrusion device 26 by a hose 28, so plastifying device 25 and extrusion device 26 can be located on parts movable with respect to each other.

Likewise, extrusion die 27 and extrusion device 26 are connected by a hose 29, so extrusion die and extrusion device 26 can be mounted on parts movable with respect to each other.

In certain embodiments, plastifying device 25 is a screw type, and comprises an inlet 30 configured to receive solid polymer material; and an outlet 31 configured to feed soft polymer material along hose 28 to extrusion device 26.

In certain embodiments, extrusion device 26 comprises a cylindrical tank 32 having an inlet 33 configured to receive soft polymer material from hose 28, and an outlet 34 configured to feed soft polymer material along hose 29 to extrusion die 27.

Extrusion device 26 comprises a piston 35 configured to expel the soft polymer material rapidly from tank 32.

Extrusion die 27 substantially comprises an extrusion outlet 36 with a cross section configured to form the exact cross section shape and size of protective sheeting 9 (FIGS. 1, 2 and 3); and a cavity (not shown) configured to guide the soft polymer material to extrusion outlet 36.

Manipulator 23 comprises a guide system 37 configured to guide extrusion die 27 along an annular path; an articulated mechanism 38 configured to move guide system 37 selectively between a work position around pipeline 1 (FIG. 7), and a rest position relatively distant from pipeline 1 (FIG. 5); and a slide 39 mounted on frame 21 and movable selectively along frame 21 in direction D2.

Figure 8:
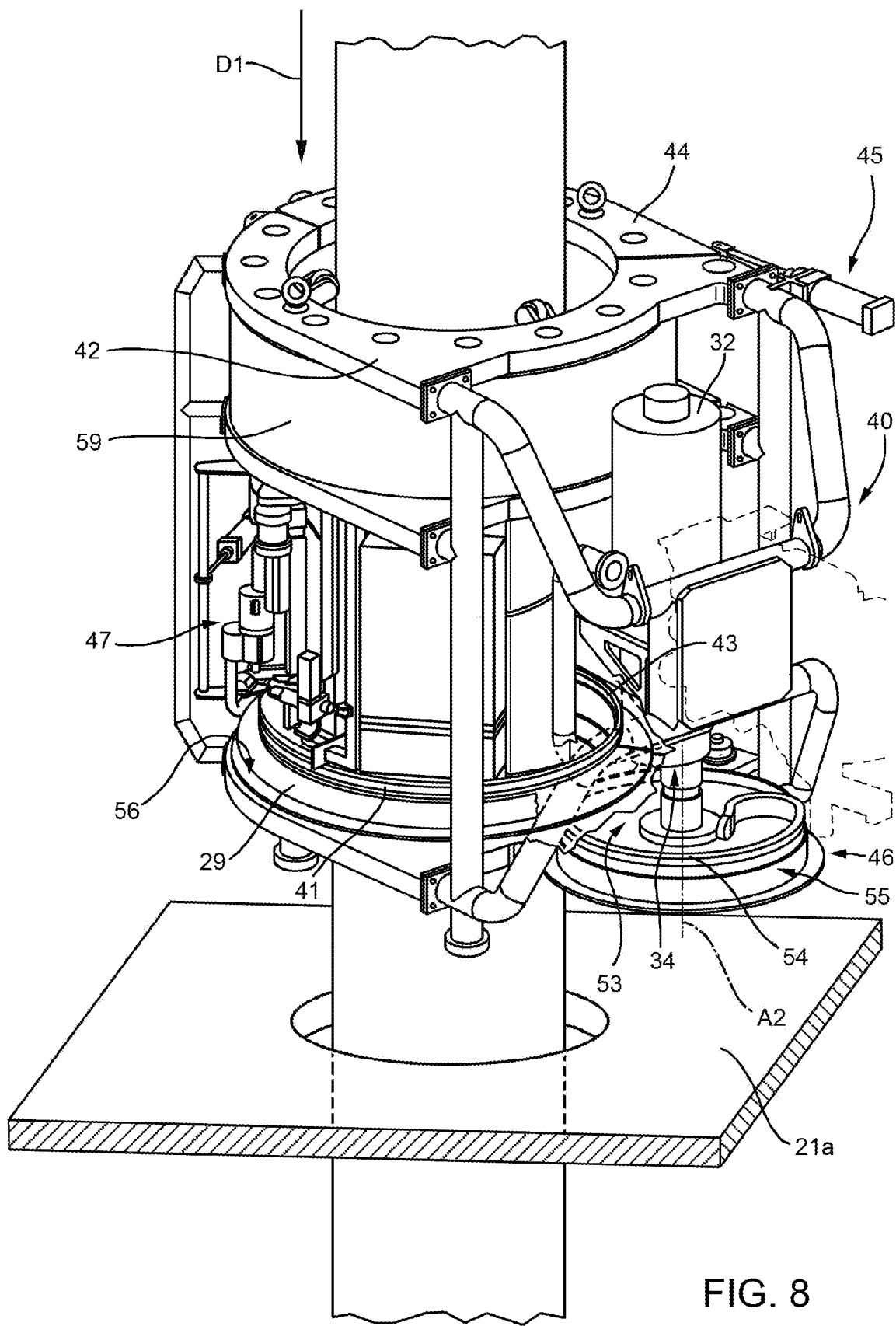
FIG. 8 shows a view in perspective, with parts removed for clarity, of a detail of the FIG. 6 apparatus.
Figure 10:
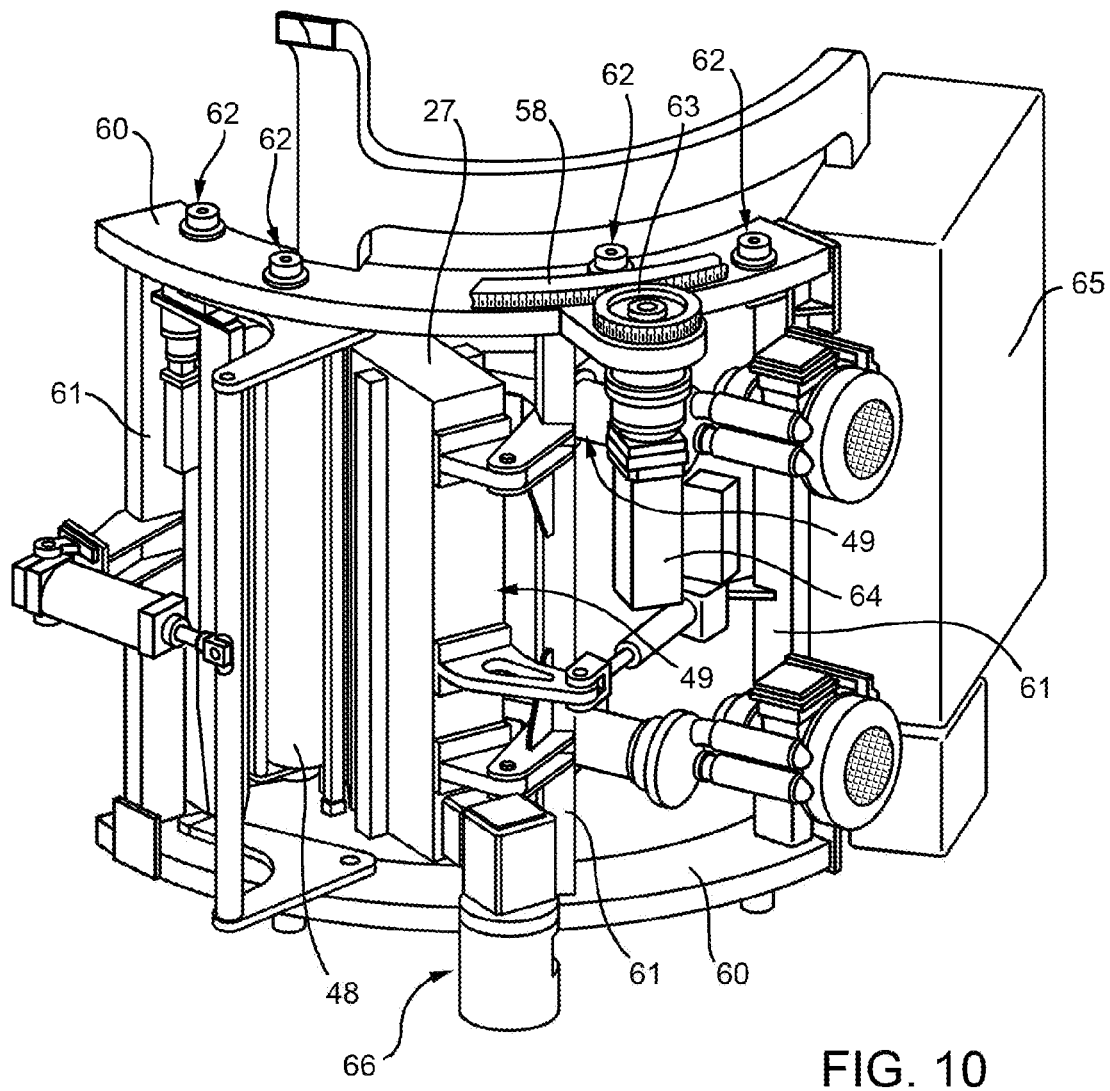
FIG. 10 shows a larger-scale view in perspective, with parts removed for clarity, of a component part of the FIGS. 6 and 7 apparatus.

With reference to FIG. 8, guide system 37 comprises:
a supporting structure 40;
two facing, parallel guides 41 and 42 integral with supporting structure 40;
two facing, parallel, movable guides 43 and 44 hinged to supporting structure 40 and complementary to guides 41 and 42;
an actuator 45 configured to open and close movable guides 43 and 44;
a winder 46 configured to wind and unwind hose 29 in controlled manner; and
a carriage 47 movable selectively along guides 41 and 42, and configured to support extrusion die 27, a roller 48, and lateral heaters 49 (FIGS. 7 and 10).

Figure 9:
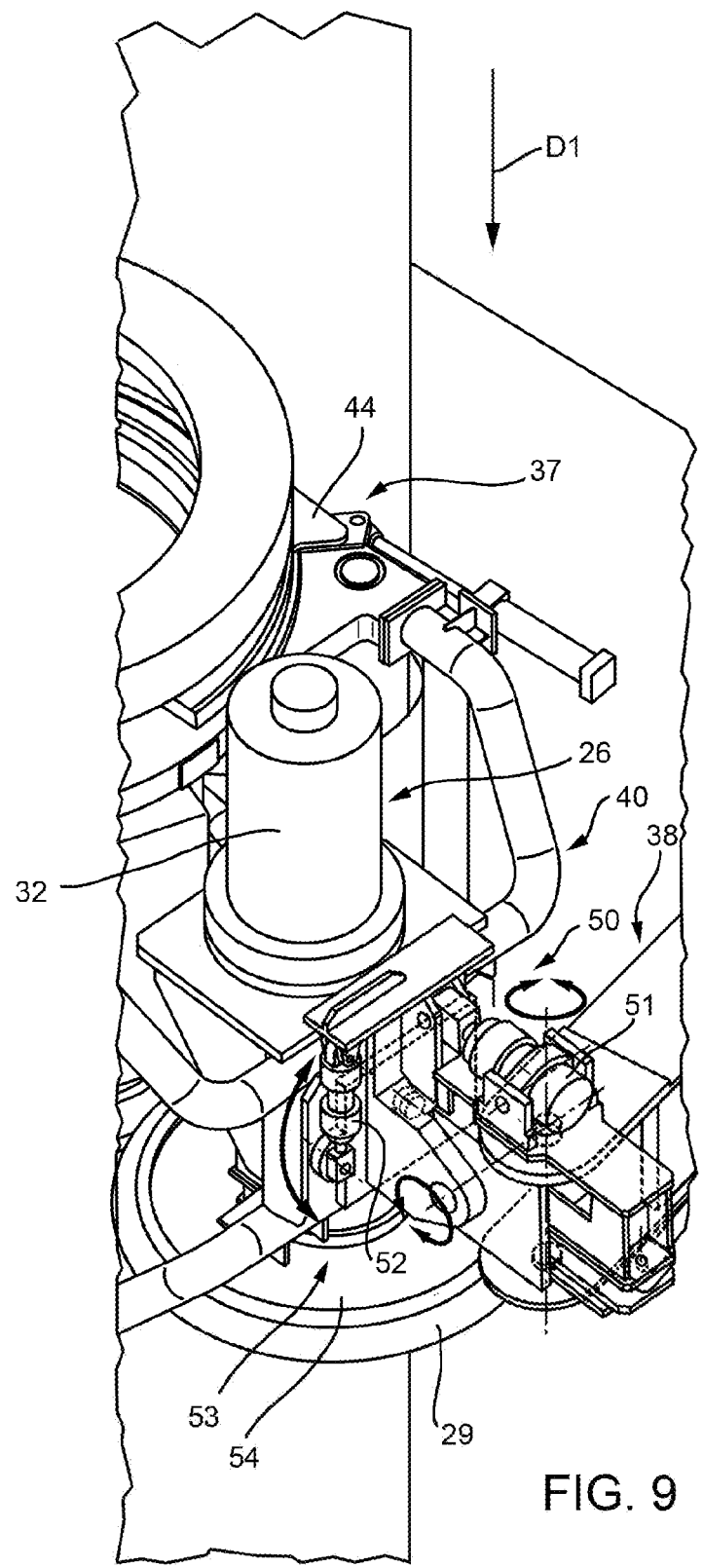
FIG. 9 shows a view in perspective, with parts removed for clarity, of a detail of the FIG. 6 apparatus.

With reference to FIG. 9, supporting structure 40 is connected to articulated system 38 by a universal joint 50 and two actuators 51 and 52.

With reference to FIG. 8, supporting structure 40 supports extrusion device 26 (FIG. 7) and winder 46, which comprises a rotary joint 53 and a reel 54 which rotates about a rotation axis A2. Rotary joint 53 and reel 54 are aligned along rotation axis A2. Rotary joint 53 comprises a fixed part connected to extrusion device 26; and a rotating portion integral with reel 54 and communicating with hose 29. Rotation of reel 54 about rotation axis A2 is powered, reversible, and coordinated with the movement of carriage 47.

Reel 54 substantially comprises an annular seat 55 configured to wind at most one turn of hose 29, and which is coplanar with guide 41 and movable guide 43.

With reference to FIGS. 6 and 7, guides 41 and 42 are arc-shaped and extend to an angle of over 180°; and movable guides 43 and 44 are complementary to respective guides 41 and 42, and so extend to an angle of less than 180°. Movable guides 43 and 44 open sufficiently to insert pipeline 1 between guides 41, 42 and movable guides 43, 44.

In the closed position, guide 41 and movable guide 43 define an outer annular seat 56 configured to house hose 29.

With reference to FIG. 3, in the closed position, guides 41 and 42 and movable guides 43 and 44 define respective inner annular seats 57. Guide 42 and movable guide 44 support an annular rack 58, and a housing 59 for electric cables (not shown in the drawings).

With reference to FIG. 10, carriage 47 comprises two facing, annular-sector-shaped plates 60; bars 61 connecting facing plates 60; rollers 62 which engage and are guided by inner annular seats 57 (FIG. 3); a pinion 63 which meshes with annular rack 58; an actuator 64 configured to activate pinion 63; and a control device 65. Extrusion die 27, roller 48, and lateral heaters 49 are mounted on carriage 47, between plates 60, so as to be movable selectively to and from pipeline 1 (FIGS. 6 and 7).

Extrusion die 27 is connected to a rotary joint 66 connectable to hose 29 (FIG. 8).

With reference to FIG. 3, guide system 37 is fitted around pipeline 1, and is centered with respect to pipeline 1 by spacers 67 enabling axial movement (in direction D1 parallel to longitudinal axis A1) of guide system 37 with respect to pipeline 1.

In certain embodiments, each spacer 67 comprises a wheel with its axis crosswise to longitudinal axis A1. At least one of spacers 67 comprises a sensor 68 configured to determine the movement of guide system 37 with respect to pipeline 1 in direction D1.

In the example shown, carriage 47 comprises a sensor 69 configured to identify a reference such as, for example, annular weld bead 7.

Control system 24 (FIGS. 6 and 7), control device 65 (FIG. 10), and sensor 69 provide for checking the correct axial position of guide system 37 along pipeline 1. If positioned wrongly, guide system 37 is moved along longitudinal axis A1 and centered with respect to cutback 8. In certain embodiments, guide system 37 is moved by moving the whole of manipulator 23 with respect to frame 21 in direction D2 by an actuator 70 (FIG. 7).

With reference to FIGS. 6 and 7, the articulated system is operated by actuators (not shown) configured to determine the position of guide system 37 in a plane perpendicular to direction D2. With reference to FIG. 5, in addition to apparatus 20 configured to apply protective sheeting 9, work station 19 also comprises a cleaning apparatus 71 and a heating apparatus 72.

Cleaning apparatus 71 comprises a manipulator 73; and an applicator 74 comprising two shells 75 configured to selectively close applicator 74 around cutback 8.

Heating apparatus 72 comprises a manipulator 76; and an applicator 77 comprising two shells 78 configured to selectively close applicator 77 around cutback 8.

Manipulators 73, 76 and shells 75, 78 provide for gritblasting and induction heating in rapid succession, so as to prepare cutback 8 to adhere to protective sheeting 9 (FIG. 1).

In actual use, as shown in FIG. 5, apparatus 20 is positioned well away from pipeline 1, so as not to interfere with apparatuses 71 and 72.

With reference to FIG. 6, plastifying device 25 is fed with polymer granules, and plastifies and transfers the material to tank 32 of extrusion device 26.

Once apparatuses 71 and 72 (FIG. 5) finish working on cutback 8, manipulator 23 moves guide system 37, with movable guides 43 and 44 open, up to pipeline 1, to position guides 41, 42 and movable guides 43, 44 around pipeline 1.

With reference to FIG. 7, movable guides 43 and 44 are then closed to connect apparatus 20 to pipeline 1.

With reference to FIG. 9, just before guide system 37 is closed completely around pipeline 1, actuators 51 and 52 are deactivated to enable universal joint 50 to move freely. In other words, just before being connected to pipeline 1, guide system 37 centers automatically with respect to pipeline 1, by being freely orientable with respect to articulated system 38 supporting it.

With reference to FIG. 3, guide system 37 is positioned axially with respect to cutback 8, if necessary, so that the position of carriage 47 enables protective sheeting 9 to be positioned fairly accurately over the end portions of coatings 4.

The axial position (in direction D1 parallel to longitudinal axis A1) of guide system 37 is adjusted by actuator 70 (FIG. 7) moving slide 39 along frame 21 in direction D2.

With reference to FIG. 7, pipeline 1 and frame 21 are not guaranteed parallel, so universal joint 50 and articulated system 38 enable guide system 37 to move freely and so center and align perfectly with pipeline 1. Once guide system 37 is centered on pipeline 1 and positioned axially with respect to cutback 8, extrusion and application of protective sheeting 9 around pipeline 1 are commenced (FIG. 7).

Extruding and applying protective sheeting 9 involve rotating carriage 47 over 360° around pipeline 1. In certain embodiments, the carriage is rotated 390° around pipeline 1 to achieve a wide overlap of the opposite ends of protective sheeting 9. At this stage, lateral heaters 49 heat end portions 10 (FIGS. 1, 2 and 3), and roller 48 presses protective sheeting 9 against pipeline 1 to ensure protective sheeting adheres firmly to pipeline 1, and to prevent the formation of air bubbles. At this point, carriage 47 is restored to its starting position, by reversing carriage along the same path traveled to apply protective sheeting 9; during which movement, protective sheeting 9 may optionally be rolled further.

Figure 11:
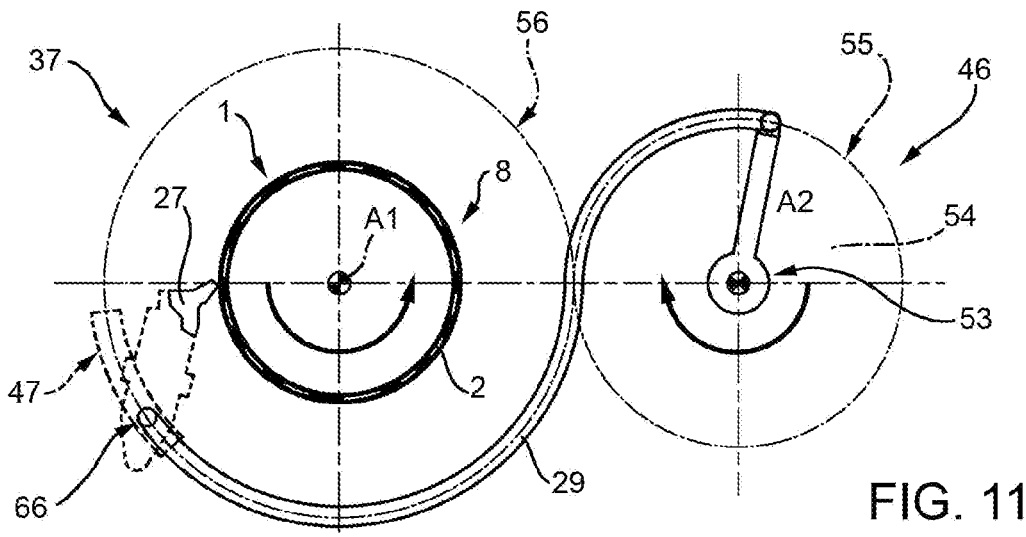
FIGS. 11 to 13 show schematic plan views of three successive operating stages of the apparatus according to the present disclosure.
Figure 12:
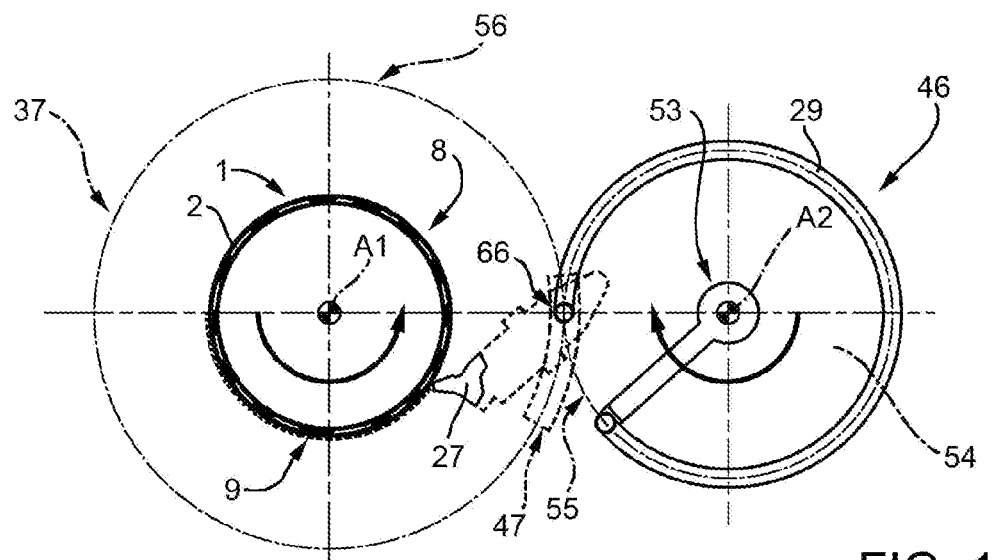
Figure 13:
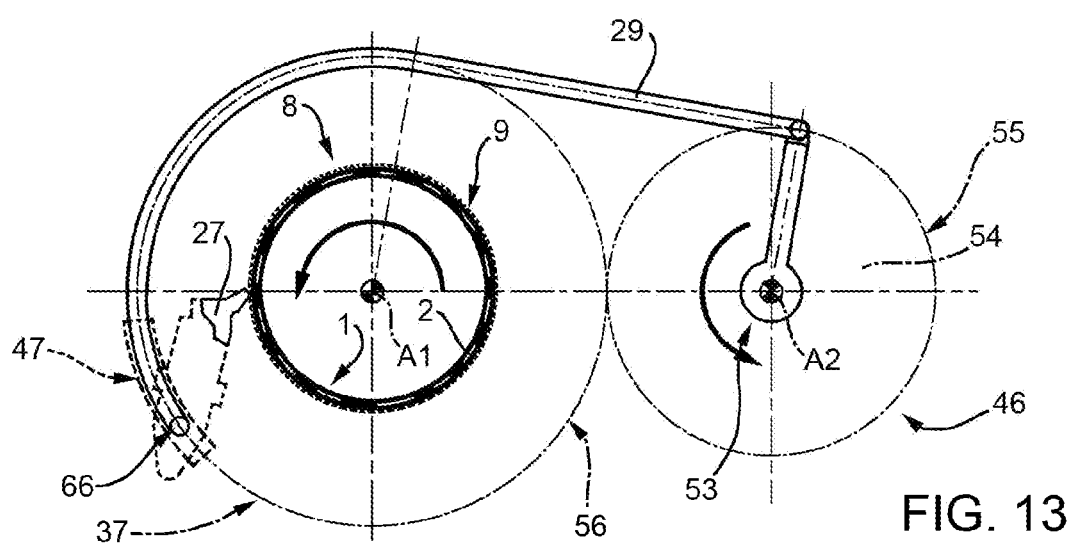

With reference to FIGS. 11 to 13, hose 29 is guided by guide system 37 and winder 46.

At the start of the extrusion operation, carriage 47 and extrusion die 27 are located on the opposite side to winder 46. As carriage 47 begins travelling anticlockwise around longitudinal axis A1, hose 29 is housed inside outer annular seat 56, and is gathered inside annular seat 55 by powered reel 54 rotating clockwise about rotation axis A2, together with rotary hydraulic joint 53.

In FIG. 12, carriage 47 is located at the point closest to winder 46, and hose 29 is wound almost completely around reel 54.

In FIG. 13, carriage 47 is close to its limit position. To enable carriage 47 to reach this position, winder 46 has released most of the hose in time with the travel of carriage 47.

Winder 46 tracks the reverse travel of carriage 47 to return carriage 47 and hose 29 to the configuration shown in FIG. 11.

Clearly, changes may be made to the embodiments of the present disclosure described with reference to the attached drawings without, however, departing from the protective scope of the accompanying Claims. In particular, though the present description refers specifically to a laying vessel equipped with a J-laying rig, the apparatus, work station and method in the Claims also apply to substantially horizontal assembly lines on laying vessels equipped with S-laying ramps. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A pipeline protective sheeting application apparatus comprising:
    a frame locatable a designated distance from a pipeline extending along a longitudinal axis transverse to a bed of a body of water;
    a manipulator fittable to the frame and movable with respect to the frame, the manipulator including a guide system separately movable between a rest position a first distance from the pipeline, and a work position a second distance from the pipeline, wherein in the work position, the guide system is fittable around the pipeline; and
    an extrusion die comprising an extrusion outlet defining a cross section corresponding in size and shape to a cross section of a protective sheeting, the extrusion die selectively movable:
        (i) along the guide system via a carriage of the guide system which supports the extrusion die and is selectively moveable along a guide of the guide system, and
        (ii) around the pipeline to supply and apply the protective sheeting around a cutback on the pipeline.

2. The pipeline protective sheeting application apparatus of claim 1, wherein the guide system includes a plurality of spacers which, in the work position, are positionable in contact with the pipeline to center the guide system around the pipeline by permitting axial movement of the guide system with respect to the pipeline.

3. The pipeline protective sheeting application apparatus of claim 2, wherein the spacers are divided into two axially spaced groups, each including at least three spacers arranged around the longitudinal axis.

4. The pipeline protective sheeting application apparatus of claim 2, wherein each spacer includes a roller configured to contact the pipeline and assist in the axial movement between the guide system and the pipeline.

5. The pipeline protective sheeting application apparatus of claim 1, wherein the manipulator is selectively movable with respect to the frame to axially adjust a position of the guide system with respect to the cutback on the pipeline.

6. The pipeline protective sheeting application apparatus of claim 1, wherein the guide system includes at least one sensor configured to determine an axial position of the guide system with respect to the cutback.

7. The pipeline protective sheeting application apparatus of claim 1, wherein the manipulator includes:
   an articulated system configured to move the guide system between the work position and the rest position, and
   a universal joint to connect the articulated system to the guide system and permit angular movement of the guide system with respect to the articulated system when the guide system is fittable around the pipeline.

8. The pipeline protective sheeting application apparatus of claim 1, which includes an extrusion device which is fittable to the guide system and is connectable, by a hose, to the extrusion die to permit relative movement between the extrusion die and the extrusion device.

9. The pipeline protective sheeting application apparatus of claim 8, which includes a winder configured to wind and unwind the hose according to a position of the extrusion die.

10. The pipeline protective sheeting application apparatus of claim 9, wherein the winder includes a reel rotatable about a rotation axis to wind and unwind the hose according to the position of the extrusion die with respect to the guide system.

11. The pipeline protective sheeting application apparatus of claim 10, which includes a rotary hydraulic joint having:
   a rotating portion that is rotatable about a rotation axis and is connectable to the hose, and
   a fixed portion rigidly connected to the extrusion outlet of the extrusion device.

12. The pipeline protective sheeting application apparatus of claim 11, wherein the reel and the rotating portion of the rotary hydraulic joint are powered to rotate both directions about the rotation axis.

13. The pipeline protective sheeting application apparatus of claim 8, which includes:
   a plastifying device; and
   a further hose configured to connect the plastifying device to the extrusion device to enable relative movement between the plastifying device and the extrusion device.

14. The pipeline protective sheeting application apparatus of claim 13, wherein the plastifying device is mounted on an articulated system.

15. The pipeline protective sheeting application apparatus of claim 1, wherein the protective sheeting includes a protective sheeting of a polymer material.

16. A pipeline protective sheeting application work station comprising:
   a pipeline protective sheeting application apparatus configured to apply a protective sheeting around a cutback on a pipeline and including:
      a frame locatable a designated distance from the pipeline extending along a longitudinal axis transverse to a bed of a body of water,
      a manipulator fittable to the frame and movable with respect to the frame, the manipulator including a guide system separately movable between a rest position a first distance from the pipeline, and a work position a second distance from the pipeline, wherein in the work position, the guide system is fittable around the pipeline, and
      an extrusion die comprising an extrusion outlet defining a cross section corresponding in size and shape to a cross section of the protective sheeting, the extrusion die selectively movable:
         (i) along the guide system via a carriage of the guide system which supports the extrusion die and is selectively moveable along a guide of the guide system, and
         (ii) around the pipeline to supply and apply the protective sheeting around a cutback on the pipeline.

* * * * *